ent invention are representable by the formula

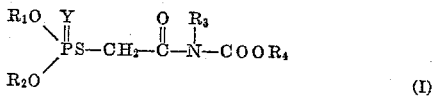
(I)

wherein each of $R_1$, $R_2$, $R_3$ and $R_4$ is a methyl ($CH_3$) or ethyl ($C_2H_5$) group, and Y is an oxygen (O) or sulfur (S) atom.

The compounds of Formula I can be prepared by reacting a compound of the formula

(II)

wherein $R_3$ and $R_4$ have the precedingly-indicated significances, and X is a halogen atom, with a compound of formula

(III)

wherein $R_1$, $R_2$ and Y are as precedingly defined, and Z is a cation. Where Z is a hydrogen atom, the reaction is carried out in the presence of an acid-binding agent.

It is preferred that the reaction be effected in a solvent, such as water, acetone, methylethylketone, dioxane or the like, or in aliphatic or aromatic hydrocarbons, or in a mixture of such solvents, at ambient or slightly elevated temperature.

Illustrative of suitable compounds of Formula II are e.g. chloroacetyl-N-alkyl-carbamic acid alkyl esters, such as chloroacetyl-N-methyl-carbamic acid methyl ester and chloroacetyl-N-methyl-carbamic acid methyl ester as well as chloroacetyl-N-ethyl-carbamic methyl ester and chloroacetyl-N-ethyl-carbamic acid ethyl ester; also the corresponding bromoacetyl compounds. (See, in this connection, Swiss Patent No. 194,377.)

Illustrative of suitable compounds of Formula III are for example:

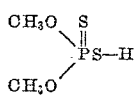

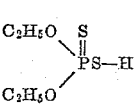

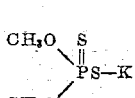

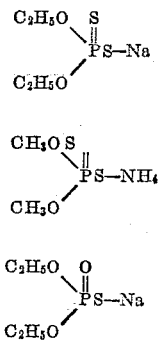

etc.

The compounds of Formula I, supra, prepared by the precedingly described process, are liquid at room temperature (about 20° to about 30° C.). They are stable in aqueous suspension, and are generally soluble in oils and in organic solvents. The new esters are outstandingly suitable for combating pests, more especially insects and spider mites (Tetranychidae sp.) in the protection of plants.

The compounds of Formula I are distinguished, relative to the corresponding non-N-alkylated compounds of the formulae:

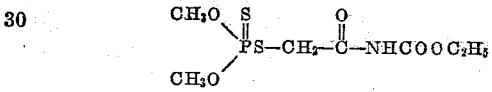

and

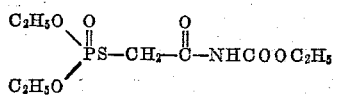

by a surprisingly higher insecticidal and systemic activity. This is illustrated by comparative test data shown on Table I, infra. This data was determined as follows:

To determine the insecticidal activity, aqueous emulsions containing 0.15% by weight of active substance were employed, and these were tested on the following insects: cockroaches (*Periplanata americana*), grasshoppers (*Carausius morosus*) and flour worm (*Tenebrio molitor*). Of each of these types, larvae of the last stage were employed. The tests were carried out as follows:

10 specimens of each type were sprayed with the above several emulsions by means of a hand spray gun at a pressure of about 1 atmosphere until the insects as well as the bottoms of the containers were uniformly wetted. The test pests remained in the sprayed containers for three days, after which the surviving ones were transferred to clean containers.

The cockroaches and flour worms were fed during the test period with untreated wafers made of sugar and starch. The grasshoppers were fed with ivy which had been sprayed, together with the test insects, with the emulsion concerned.

The toxic action of the compounds was checked daily by counting the paralyzed and killed individuals. The observed results are characterized by the following characteristic values:

(a) *K-value.*—I.e. the number of test individuals of the above-named three types, which were paralyzed or killed 24 hours after the treatment, expressed in percent of the initial number of test individuals.

(b) *M-value.*—I.e. the number of dead test individuals of the above-named three 10 days after the treatment, expressed in percent of the initial number of test individuals.

TABLE I

| Compound | K-value | M-value |
|---|---|---|
| $\text{CH}_3\text{O}\diagdown\underset{\text{CH}_3\text{O}\diagup}{\overset{\text{S}}{\overset{\|}{\text{P}}}}\text{S}-\text{CH}_2-\overset{\text{O}}{\overset{\|}{\text{C}}}-\text{NHCOOC}_2\text{H}_5$ | 3 | 6 |
| $\text{C}_2\text{H}_5\text{O}\diagdown\underset{\text{C}_2\text{H}_5\text{O}\diagup}{\overset{\text{S}}{\overset{\|}{\text{P}}}}\text{S}-\text{CH}_2-\overset{\text{O}}{\overset{\|}{\text{C}}}-\text{NHCOOC}_2\text{H}_5$ | 0 | 10 |
| $\text{CH}_3\text{O}\diagdown\underset{\text{CH}_3\text{O}\diagup}{\overset{\text{S}}{\overset{\|}{\text{P}}}}\text{S}-\text{CH}_2-\overset{\text{O}}{\overset{\|}{\text{C}}}-\overset{\text{CH}_3}{\overset{\|}{\text{N}}}\text{COOC}_2\text{H}_5$ | 100 | 70 |
| $\text{C}_2\text{H}_5\text{O}\diagdown\underset{\text{C}_2\text{H}_5\text{O}\diagup}{\overset{\text{S}}{\overset{\|}{\text{P}}}}\text{S}-\text{CH}_2-\overset{\text{O}}{\overset{\|}{\text{C}}}-\overset{\text{CH}_3}{\overset{\|}{\text{N}}}\text{COOC}_2\text{H}_5$ | 83 | 70 |

The results clearly show that the radical $R_3$ in the compounds of Formula I is of decisive significance for insecticidal action.

In comparison with compounds which have no

—COOR$_4$ group connected to the nitrogen atom, the esters of the present invention exhibit the advantage of essentially lower toxicity to warm-blooded animals, as shown by the following comparative results:

TABLE II

| Compound | Toxicity to Warm-Blooded Animal DL-50, oral, white mouse, mg./kg. |
|---|---|
| $\text{CH}_3\text{O}\diagdown\underset{\text{CH}_3\text{O}\diagup}{\overset{\text{S}}{\overset{\|}{\text{P}}}}\text{S}-\text{CH}_2-\overset{\text{O}}{\overset{\|}{\text{C}}}-\overset{\text{CH}_3}{\overset{\|}{\text{N}}}\text{H}$ | 134 |
| $\text{CH}_3\text{O}\diagdown\underset{\text{CH}_3\text{O}\diagup}{\overset{\text{S}}{\overset{\|}{\text{P}}}}\text{S}-\text{CH}_2-\overset{\text{O}}{\overset{\|}{\text{C}}}-\overset{\text{CH}_3}{\overset{\|}{\text{N}}}\text{COOCH}_3$ | 350 |
| $\text{CH}_3\text{O}\diagdown\underset{\text{CH}_3\text{O}\diagup}{\overset{\text{S}}{\overset{\|}{\text{P}}}}\text{S}-\text{CH}_2-\overset{\text{O}}{\overset{\|}{\text{C}}}-\overset{\text{CH}_3}{\overset{\|}{\text{N}}}\text{COOC}_2\text{H}_5$ | 290 |

In practice—i.e. in the field or garden as well as in the greenhouse or in the home, etc.—the combating of pests with the aid of the mono- and dithiophosphoric acid esters of Formula I is preferably carried out by admixing the ester with an emulsifier, e.g. with a liquid polyglycolether resulting from the addition of ethylene oxide onto a high molecular alcohol, mercaptan or alkylphenol, emulsifying the resultant mixture in water, and then spraying the obtained emulsion onto the surfaces to be treated. Further suitable organic solvents, such as mono- or poly-alcohols, ketones, aromatic hydrocarbons, mineral oils, etc., can be incorporated into the emulsion as solution aids. However, solid carriers such as talc, kaolin, kieselguhr, bentonite, etc. can also be incorporated into the emulsion, if it is desired to prepare powdered products capable of being suspended in water. The liquid or pulverulent products of the indicated type are converted into aqueous emulsions or dispersions prior to use, it being preferable that the resultant emulsions or suspensions contain 0.005 to 0.2% by weight of active ester I.

However, the mono- and dithiophosphoric acid esters I can also be used without addition of emulsifiers, but can, if necessary or desired, be worked up into dusting or scattering compositions with an inert carrier, such as talc, kaolin, kieselguhr, bentonite, etc. or with a mixture of such carriers, if necessary or desired also with addition of an adhesive agent.

The following examples set forth presently-preferred exemplary embodiments of the invention, solely by way of illustration and not by way of limitation. In these examples, parts are by weight unless otherwise indicated; the relationship between parts by weight and parts by volume is the same as that between grams and milliliters. Percentages are by weight; temperatures are in degrees centigrade.

*Example 1*

90 parts of chloroacetyl-N-methyl-carbamic acid ethylester (B.P.$_{11}$ 113–114°; M.P. 37°) and 88 parts of ammonium O,O-dimethyldithiophosphate are refluxed together with 350 parts by volume of acetone, for 2 hours and while stirring the mixture. After cooling the latter, 1000 parts by volume of water are added, the diluted mixture extracted with ether, and the ether extract dried with sodium sulfate. After distilling off the ether, there is obtained a bright yellow oil which consists chiefly of the compound of the formula $$\text{CH}_3\text{O}\diagdown\underset{\text{CH}_3\text{O}\diagup}{\overset{\text{S}}{\overset{\|}{\text{P}}}}\text{S}-\text{CH}_2-\overset{\text{O}}{\overset{\|}{\text{C}}}-\overset{\text{CH}_3}{\overset{\|}{\text{N}}}-\text{COOC}_2\text{H}_5$$

$n_D^{20}$ 1.5154. S calculated: 21.3%. Found: 21.9%. N calculated: 4.7%. Found: 4.7%.

*Example 2*

The procedure according to Example 1 is repeated with 90 parts of chloroacetyl-N-methyl-carbamic acid ethylester and 102 parts of ammonium O,O-diethyldithiophosphate, as starting materials, thereby obtaining a practically colorless oil consisting of the compound of the formula $$\text{C}_2\text{H}_5\text{O}\diagdown\underset{\text{C}_2\text{H}_5\text{O}\diagup}{\overset{\text{S}}{\overset{\|}{\text{P}}}}\text{S}-\text{CH}_2-\overset{\text{O}}{\overset{\|}{\text{C}}}-\overset{\text{CH}_3}{\overset{\|}{\text{N}}}-\text{COOC}_2\text{H}_5$$

$n_D^{20}$ 1.5049. S calculated: 19.5%. Found: 20.0%. N calculated: 4.3%. Found: 4.4%.

*Example 3*

42 parts of bromoacetyl-N-methyl-carbamic acid methylester (B.P.$_{12}$ 115°) and 41.6 parts of sodium O,O-diethyldithiophosphate are stirred together for 2 hours at 60–70° in 150 parts by volume of methylethylketone. After cooling the mixture, 500 parts by volume of water are added, the diluted mixture extracted with chloroform, and the chloroform extract dried with sodium sulfate. After distilling off the solvent, the compound of the formula $$\text{C}_2\text{H}_5\text{O}\diagdown\underset{\text{C}_2\text{H}_5\text{O}\diagup}{\overset{\text{S}}{\overset{\|}{\text{P}}}}\text{S}-\text{CH}_2-\overset{\text{O}}{\overset{\|}{\text{C}}}-\overset{\text{CH}_3}{\overset{\|}{\text{N}}}-\text{COOCH}_3$$

is obtained as a yellow oil, $n_D^{20}$ 1.5218. N calculated: 4.4%. Found 4.3%.

*Example 4*

90 parts of chloroacetyl-N-methyl-carbamic acid ethylester are stirred into a solution of 93 parts of O,O-diethyldithiophosphoric acid in 500 parts by volume of benzene. Thereupon 35 parts of a 25% aqueous ammonia solution (d. 15/15=0.910) are added dropwise in the course of 15 minutes at 10–15°, after which stirring is continued for 6 more hours at 60–70°. After cooling the resultant mixture to 20°, 500 parts by volume of water are stirred in, the benzene layer separated in a separatory funnel, dried with sodium sulfate, and the solvent distilled off on the water bath, finally in a water jet vacuum. The product is identical with that according to Example 2, and is obtained as a light oil.

*Example 5*

24 parts of pulverulent potassium carbonate are added to 150 parts by volume of acetone, after which—while stirring slowly—56 parts of O,O-diethyldithiophosphoric acid are added. After the addition of 50 parts by volume of water, 49.7 parts of chloroacetyl-N-methylcarbamic acid methylester (B.P.$_{12}$ 103–105°) are added dropwise, followed by stirring of the mixture for two more hours at 50–55°. After working up the resultant reaction mixture after the manner described in Example 1, the product according to Example 3 is obtained as a practically colorless oil.

*Example 6*

83 parts of chloroacetyl-N-ethyl-carbamic acid ethylester (B.P.$_{12}$ 118–120°) and 98 parts of potassium O,O-dimethyldithiophosphate are stirred together in 350 parts by volume of dioxane for four hours at 60–70°. After cooling the reaction mixture, 500 parts by volume of water are added thereto, the diluted mixture shaken out with ether, and the resultant ether solution separated. After distilling off the solvent, the compound of the formula

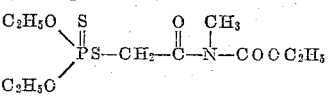

is obtained as a practically colorless oil, $n_D^{20}$ 1.5118. S calculated: 20.3%. Found: 20.7%. N calculated: 4.4%. Found: 4.4%.

*Example 7*

76.8 parts of sodium O,O-diethylthiolphosphate are are suspended in 250 parts by volume of methylethylketone. 66.4 parts of chloroacetyl-N-methyl-carbamic acid methylester are then stirred in dropwise at 60°, stirring being then continued for two more hours at 60–70°. After cooling the so-obtained reaction mixture, it is shaken out with 500 parts by volume of water, the oily product which separates is taken up in ether, and the product worked as in Example 1, whereupon the compound of the formula

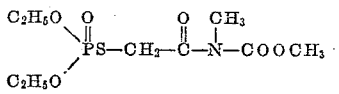

is obtained as a light yellow oil, $n_D^{20}$ 1.4828. N calculated: 4.7%. Found: 4.9%.

TABLE III

| Example No. | Compound | Properties | S calc., found | N calc., found |
|---|---|---|---|---|
| 8 | CH₃O\\PS—CH₂—C—N—COOCH₃ (with S, O CH₃ groups); CH₃O/ | light yellow oil, $n_D^{20}$ 1.5292 | 22.3 / 22.2 | 4.9 / 5.1 |
| 9 | CH₃O\\PS—CH₂—C—N—COOCH₃ (with S, O C₂H₅ groups); CH₃O/ | light yellow oil, $n_D^{20}$ 1.5194 | 21.3 / 21.8 | 4.6 / 4.5 |
| 10 | C₂H₅O\\PS—CH₂—C—N—COOCH₃ (with S, O C₂H₅ groups); C₂H₅O/ | light yellow oil, $n_D^{20}$ 1.5118 | ---- | 4.3 / 4.4 |
| 11 | C₂H₅O\\PS—CH₂—C—N—COOC₂H₅ (with S, O C₂H₅ groups); C₂H₅O/ | practically colorless oil, $n_D^{20}$ 1.5048 | ---- | 4.1 / 4.1 |
| 12 | C₂H₅O\\PS—CH₂—C—N—COOC₂H₅ (with S, O CH₃ groups); C₂H₅O/ | light yellow oil, $n_D^{20}$ 1.4775 | ---- | 4.5 / 4.4 |

*Example 13*

50 parts by weight of the ester of the formula

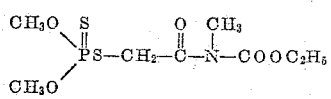

are admixed with 50 parts of isooctylphenylheptaglycolether, a clear solution being obtained. An aqueous emulsion of this solution, which emulsion contains 0.02% of the ester, is sprayed on young apple trees infested with aphids. In a short time, all the aphids are dead.

*Example 14*

20 parts of the ester of the formula

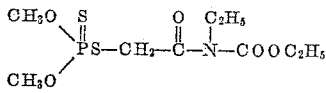

are admixed with 30 parts of isooctylphenyloctaglycolether and 50 parts of a petroleum fraction which boils at 210–280° and has a specific gravity (20°) of 0.92, a clear solution of good emulsifiability in water being obtained. A 0.05–0.1% aqueous emulsion of this solution effects a 100% kill of all stages of spider mites (*Tetranychus telarius*) sprayed therewith.

A similar action is realized against *Paratetranychus pilosus*.

The ester of the above formula may, with equal success, be replaced by the corresponding quantity of the ester of the formula

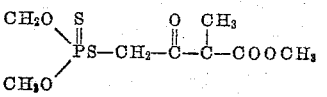

or of the ester of the formula

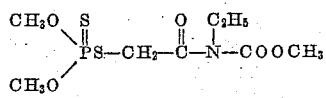

Example 15

20 parts by weight of the ester of the formula

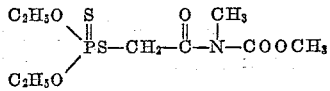

are admixed with 20 parts of laurylhexaglycolether and 60 parts of xylene, the product being of good emulsifiability in water. A 0.1% aqueous emulsion of such product is sprayed on aphid-infested potted plants (cinneraria, asters, chrysanthemums). All the aphids are killed in a short period of time. The compound of the indicated formula may, with like success, be replaced by a corresponding quantity of the ester of the formula

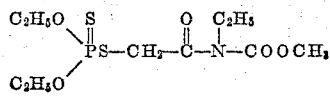

Example 16

An excellently water-emulsifiable agent is obtained by admixing 20 parts of the ester of the formula

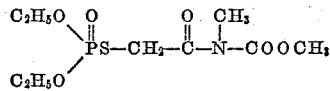

with 20 parts of diisohexyl/heptylphenylhexaglycolether and 60 parts of a mixture consisting of 3 parts of propyleneglycol and one part of butoxyethoxyethanol. An aqueous emulsion of this agent, which emulsion contains 0.02% of said ester, effects a complete kill of aphids—sprayed therewith—in a short time.

The said ester may be replaced by the corresponding quantity of the ester of the formula

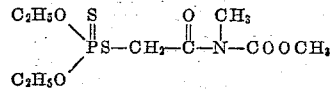

with like success.

Example 17

A product of good emulsifiability in water is obtained by admixing 25 parts of the ester of the formula

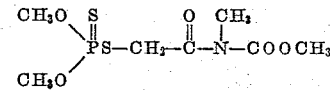

with 25 parts of diisohexyl/heptylphenylhexaglycolether, 25 parts of xylene and 25 parts of diethyleneglycol. Potted spiderwort (*Tradescantia virginica*) plants of about 20 cm. height are watered with 100 cc. of an emulsion of the said product, which emulsion contains 0.02% of the active ester, without touching the green parts of the plants. One day later, 30 carausius larvae in the second starge of development are placed on the thus-treated plants. The larvae take in together with the leaf parts which they eat, also the active agent—the compound of the aforesaid formula—which is absorbed by the plant through its roots and transported into the leaves. After 8 days, all the larvae were dead.

A 0.1% aqueous emulsion of the same active agent was sprayed onto Canadian erigeron (*Erigeron canadensis*) plants, infested with aphids, in such manner that only the lower parts of the plants (not the roots) were wetted, while the upper parts of the plants—which were aphid-infested—remained untreated. In two or three days, all the aphids on the not-directly treated parts were dead.

If bean plants in the two-leaf stage, infested with *Aphis fabae*, are sprayed with an aqueous emulsion of the same product, which emulsion contains 0.02% of the said ester, the aphids are dead in several hours.

The ester employed in the present example can, with like success, be replaced by a corresponding quantity of the ester of the formula

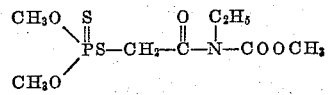

or of the formula

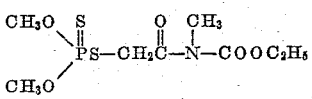

Example 18

A pulverulent product of good suspendability in water is obtained if 15 parts by weight of the ester of the formula

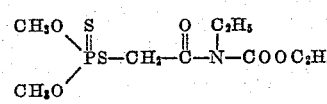

are thoroughly admixed with 3 parts of tert. dodecylmercaptanundecaglycolether, 7 parts of powdered silica gel and 75 parts of kaolin. An aqueous suspension of this product, which suspension contains 0.05% of the said ester has a 100% killing action in a short time when sprayed on aphids.

The ester employed in the present example can, with like success, be replaced by a corresponding quantity of the ester of the formula

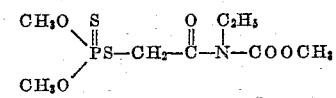

Example 19

2 parts of the ester of the formula

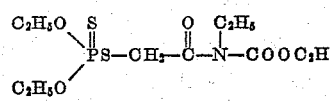

are admixed with 98 parts of talc and the mixture is ground in a ball mill. There is obtained a dusting agent which kills cockroaches (*Periplaneta americana*) which come into contact therewith, in 24 to 48 hours.

The ester of this example may, with like success, be replaced by a corresponding quantity of the ester of the formula

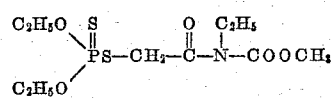

Example 20

50 parts of the ester of the formula

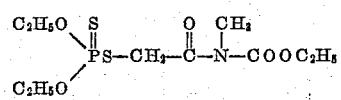

are admixed with 40 parts of tert. dodecylmercaptanundecaglycolether [$C_{12}H_{25}S(CH_2CH_2O)_{11}H$] and 10 parts of a mineral oil with the following properties: boiling point 320–405°, 20–30% sulfonatable fractions, specific gravity (20°) 0.90–0.92. A clear solution of good water-emulsifiability is obtained. An aqueous emulsion of this solution, which emulsion contains 0.02% of the said ester, has a total killing action on aphids in a few hours.

A like action is realized if, instead of the said ester, use is made in this example of a corresponding quantity of the ester of the formula

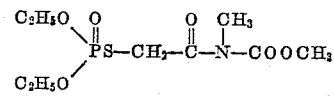

or of the formula

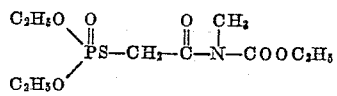

Example 21

By mixing 25 parts of the ester of Example 8 with 25 parts of nonylphenylnonaglycolether and 50 parts of methylethylketone, a spraying agent which is water-emulsifiable is obtained. A 0.1% aqueous emulsion of this agent has an unfailing killing action on spider mites in all stages of development thereof. Similar results are obtainable by replacing the ester of Example 8 by the corresponding quantity of any one of the esters of Examples 1, 2, 3 and 9.

Having thus disclosed the invention what is claimed is:

1. The method of combating insecticidal and acaricidal pests which comprises bringing the said pests into contact with an effective quantity of a compound of the formula

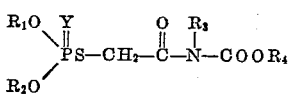

wherein each of $R_1$, $R_2$, $R_3$ and $R_4$ is an alkyl group containing a maximum of two carbon atoms, and Y is a member selected from the group consisting of O and S.

2. The method of combating insecticidal and acaricidal pests which comprises bringing the said pests into contact with an effective quantity of a compound of the formula

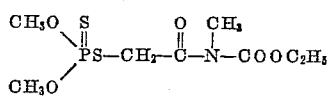

3. The method of combating insecticidal and acaricidal pests which comprises bringing the said pests into contact with an effective quantity of a compound of the formula

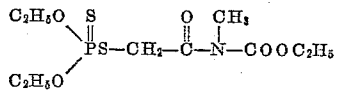

4. The method of combating insecticidal and acaricidal pests which comprises bringing the said pests into contact with an effective quantity of a compound of the formula

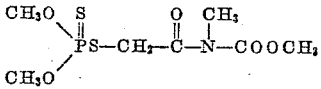

5. The method of combating insecticidal and acaricidal pests which comprises bringing the said pests into contact with an effective quantity of a compound of the formula

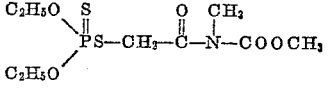

6. The method of combating insecticidal and acaricidal pests which comprises bringing the said pests into contact with an effective quantity of a compound of the formula

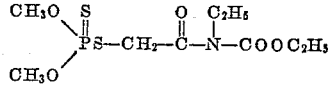

7. The method of combating insecticidal and acaricidal pests which comprises bringing the said pests into contact with an effective quantity of a compound of the formula

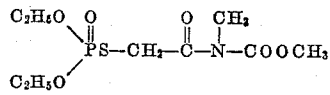

8. A water-emulsifiable insecticidal and acaricidal concentrate consisting essentially of a compound of the formula

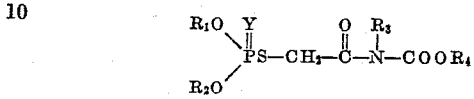

wherein each of $R_1$, $R_2$, $R_3$ and $R_4$ is an alkyl group containing a maximum of two carbon atoms, and Y is a member selected from the group consisting of O and S, and an emulsifier therefor.

9. A water-emulsifiable insecticidal and acaricidal concentrate consisting essentially of a compound of the formula

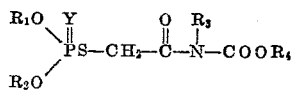

wherein each of $R_1$, $R_2$, $R_3$ and $R_4$ is an alkyl group containing a maximum of two carbon atoms, and Y is a member selected from the group consisting of O and S, an emulsifier therefor, and a solid carrier.

10. An insecticide-acaricide consisting essentially of an aqueous emulsion of a compound of the formula

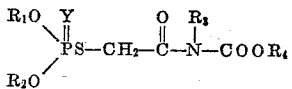

wherein each of $R_1$, $R_2$, $R_3$ and $R_4$ is an alkyl group containing a maximum of two carbon atoms, and Y is a member selected from the group consisting of O and S, said insecticide-acaricide containing 0.005 to 0.2% by weight of said compound.

11. An insecticide-acaricide consisting essentially of an aqueous dispersion of a compound of the formula

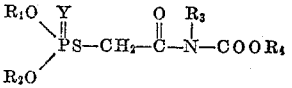

wherein each of $R_1$, $R_2$, $R_3$ and $R_4$ is an alkyl group containing a maximum of two carbon atoms, and Y is a member selected from the group consisting of O and S, said insecticide-acaricide containing 0.005 to 0.2% by weight of said compound.

12. A compound of the formula

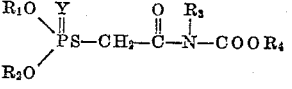

wherein each of $R_1$, $R_2$, $R_3$ and $R_4$ is an alkyl group containing a maximum of two carbon atoms, and Y is a member selected from the group consisting of O and S.

13. A compound of the formula

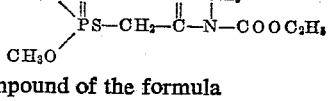

14. A compound of the formula

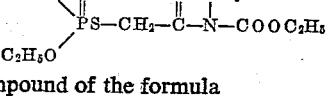

15. A compound of the formula

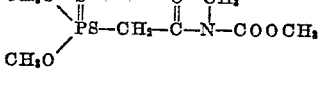

16. A compound of the formula
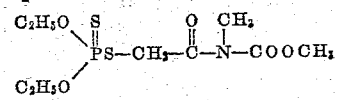
17. A compound of the formula
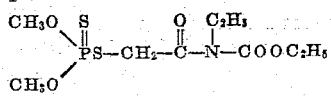
18. A compound of the formula
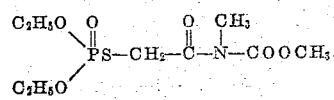
References Cited in the file of this patent
UNITED STATES PATENTS
2,864,849    Schrader _____ Dec. 16, 1958